US012005554B2

(12) United States Patent
Sato

(10) Patent No.: US 12,005,554 B2
(45) Date of Patent: Jun. 11, 2024

(54) OPENING DEVICE AND METHOD FOR DRIVING SECURING TOOL INTO ARTIFICIAL TURF

(71) Applicant: GREENFIELD CO., INC., Iwate (JP)

(72) Inventor: Shigeru Sato, Iwate (JP)

(73) Assignee: GREENFIELD CO., INC., Iwate (JP)

( * ) Notice: Subject to any disclaimer, the term of this patent is extended or adjusted under 35 U.S.C. 154(b) by 284 days.

(21) Appl. No.: 17/440,637

(22) PCT Filed: Apr. 9, 2020

(86) PCT No.: PCT/JP2020/015918
§ 371 (c)(1),
(2) Date: Sep. 17, 2021

(87) PCT Pub. No.: WO2020/218001
PCT Pub. Date: Oct. 29, 2020

(65) Prior Publication Data

US 2022/0152804 A1 May 19, 2022

(30) Foreign Application Priority Data

Apr. 25, 2019 (JP) ................................ 2019-083668

(51) Int. Cl.
*B25C 7/00* (2006.01)

(52) U.S. Cl.
CPC ..................................... *B25C 7/00* (2013.01)

(58) Field of Classification Search
CPC .................................... B25C 7/00; B27F 7/09
See application file for complete search history.

(56) References Cited

U.S. PATENT DOCUMENTS

2002/0111600 A1 8/2002 Cormier et al.

FOREIGN PATENT DOCUMENTS

| | | | | | |
|---|---|---|---|---|---|
| JP | 06-185010 | A | | 7/1994 | |
| JP | 08-300306 | A | | 11/1996 | |
| JP | 9-094776 | A | | 4/1997 | |
| JP | 09-099403 | A | | 4/1997 | |
| JP | H 09-099403 | A | * | 4/1997 | ............... B25H 5/00 |
| JP | 2003-516205 | A | | 5/2003 | |
| JP | 3117361 | U | | 11/2005 | |
| WO | 2001041864 | A1 | | 6/2001 | |
| WO | 2020218001 | A1 | | 10/2020 | |

OTHER PUBLICATIONS

Souki Kogyo, Machine Translation of JPH 09-099403A, 1997, Supplied by Applicant in IDS dated Sep. 17, 2021 (Year: 2021).*
World Intellectual Property Organization, International Search Report for international application No. PCT/JP2020/015918, dated Jun. 23, 2020, 8 total pages.

* cited by examiner

*Primary Examiner* — Veronica Martin
(74) *Attorney, Agent, or Firm* — SoCal IP Law Group LLP; Mark Andrew Goldstein

(57) ABSTRACT

An opening device for parting grass of artificial turf and exposing the base of the artificial turf to drive a securing tool into the artificial turf. The opening device comprises: a tip part extending in the longitudinal direction; and first and second side parts connected to the tip part, and has an opening between the first and second side parts for insertion of the securing tool such as a U-shaped nail. The distance between the outer edges of the first and second side parts is greater than the width of the tip part.

5 Claims, 7 Drawing Sheets

OPENING DEVICE AND METHOD FOR DRIVING SECURING TOOL INTO ARTIFICIAL TURF

RELATED APPLICATION INFORMATION

This patent claims priority from International PCT Patent Application No. PCT/JP2020/015918, filed Apr. 9, 2020 entitled, "OPENING DEVICE AND METHOD FOR DRIVING SECURING TOOL INTO ARTIFICIAL TURF", which claims priority to Japanese Patent Application No. 2019-083668, filed Apr. 4, 2019 all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

The present invention relates to an opening tool (opening device) used to drive a fastener (securing tool) such as a U-shaped nail into artificial grass, and a method for driving the fastener into the artificial grass (artificial turf).

BACKGROUND ART

Devices for driving a fastener such as a U-shaped nail into artificial grass and fixing the artificial grass to the ground are disclosed in, for example, Patent Documents 1 and 2.

Patent Document 1: Japanese Unexamined Patent Application, Publication No. H08-300306.

Patent Document 2: Japanese Unexamined Patent Application, Publication No. H09-094776.

SUMMARY OF THE INVENTION

Problems to be Solved by the Invention

When driving a U-shaped nail into artificial grass, it is required to drive the U-shaped nail while avoiding the artificial grass so that the U-shaped nail does not become entangled with the artificial grass and while pulling out the entangled artificial grass, but such work is laborious.

It is an object of the present invention to provide an opening tool for artificial grass capable of exposing the bottom of artificial grass so that a U-shaped nail does not become entangled with the artificial grass.

Means for Solving the Problems (1) A first embodiment according to the present invention is an opening tool that separates grass of artificial grass to expose a bottom of the artificial grass. The opening tool includes a leading end portion that extends in a longitudinal direction, and a first side portion and a second side portion that are connected to the leading end portion. An opening is formed between the first side portion and the second side portion. The opening is an opening through which a fastener for fixing the artificial grass can pass. A distance between an outer edge of the first side portion and that of the second side portion is greater than a width of the leading end portion.

(2) The opening tool according to the first aspect preferably includes a pair of handles, a first coupler that serves as a fulcrum for the pair of handles, two second couplers each provided at a leading end of a respective one of the pair of handles, two rods each having one end connected to a respective one of the two second couplers, the two rods being capable of moving in a width direction, a support having one end connected to the first coupler, two plates each rotatably connected to a respective one of the two rods, two relay members each having one end connected to the other end of a respective one of the two rods, two third couplers each connecting the other end of a respective one of the two rods to the one end of a respective one of the two relay members, and a fourth coupler that connects the other ends of the two relay members and is movably fitted into an elongated hole provided in the support. The support preferably includes the leading end portion. Preferably, one of the two rods and one of the two plates serve as the first side portion, and the other of the two rods and the other of the two plates serve as the second side portion. The opening is preferably formed between the support and one of the two rods.

(3) The opening tool according to the first aspect preferably includes a pair of handles, a first coupler that serves as a fulcrum for the pair of handles, two second couplers each provided at a leading end of a respective one of the pair of handles, two rods each having one end connected to a respective one of the two second couplers, the two rods being capable of moving in a width direction, a support having one end connected to the first coupler, two plates each rotatably connected to a respective one of the two rods, two relay members each having one end connected to the other end of a respective one of the two rods, two third couplers each connecting the other end of a respective one of the two rods to the one end of a respective one of the two relay members, and a fourth coupler that connects the other ends of the two relay members and is movably fitted into an elongated hole provided in the support. The support preferably includes the leading end portion. Preferably, one of the two rods and one of the two plates serve as the first side portion, and the other of the two rods and the other of the two plates serve as the second side portion. The opening is preferably formed in the support.

(4) The opening tool according to the first aspect preferably includes a handle, and a central portion having one end connected to the handle and the other end including the leading end portion. Preferably, the first side portion and the second side portion are respectively connected to both sides of the central portion. The opening is preferably formed in the central portion.

(5) A second embodiment according to the present invention is a method for driving a fastener into artificial grass using an opening tool that separates grass of the artificial grass to expose a bottom of the artificial grass. The opening tool includes a leading end portion that extends in a longitudinal direction, and a first side portion and a second side portion that are connected to the leading end portion. An opening is formed between the first side portion and the second side portion. The opening is an opening through which the fastener for fixing the artificial grass can pass. A distance between an outer edge of the first side portion and that of the second side portion is greater than a width of the leading end portion. The method includes inserting the leading end portion of the opening tool into the grass initially, pushing the grass apart with the first side portion and the second side portion to expose the bottom, and driving the fastener into the bottom through the opening.

Effects of the Invention

According to the present invention, it is possible to separate the grass of artificial grass to expose the bottom of the artificial grass. By exposing the bottom of the artificial grass, a fastener for the artificial grass can be easily driven so as not to become entangled with the artificial grass.

THE DRAWINGS

DETAILED DESCRIPTION

Embodiments of the present invention will now be described in detail with reference to the drawings.

First Embodiment

Figure 1:
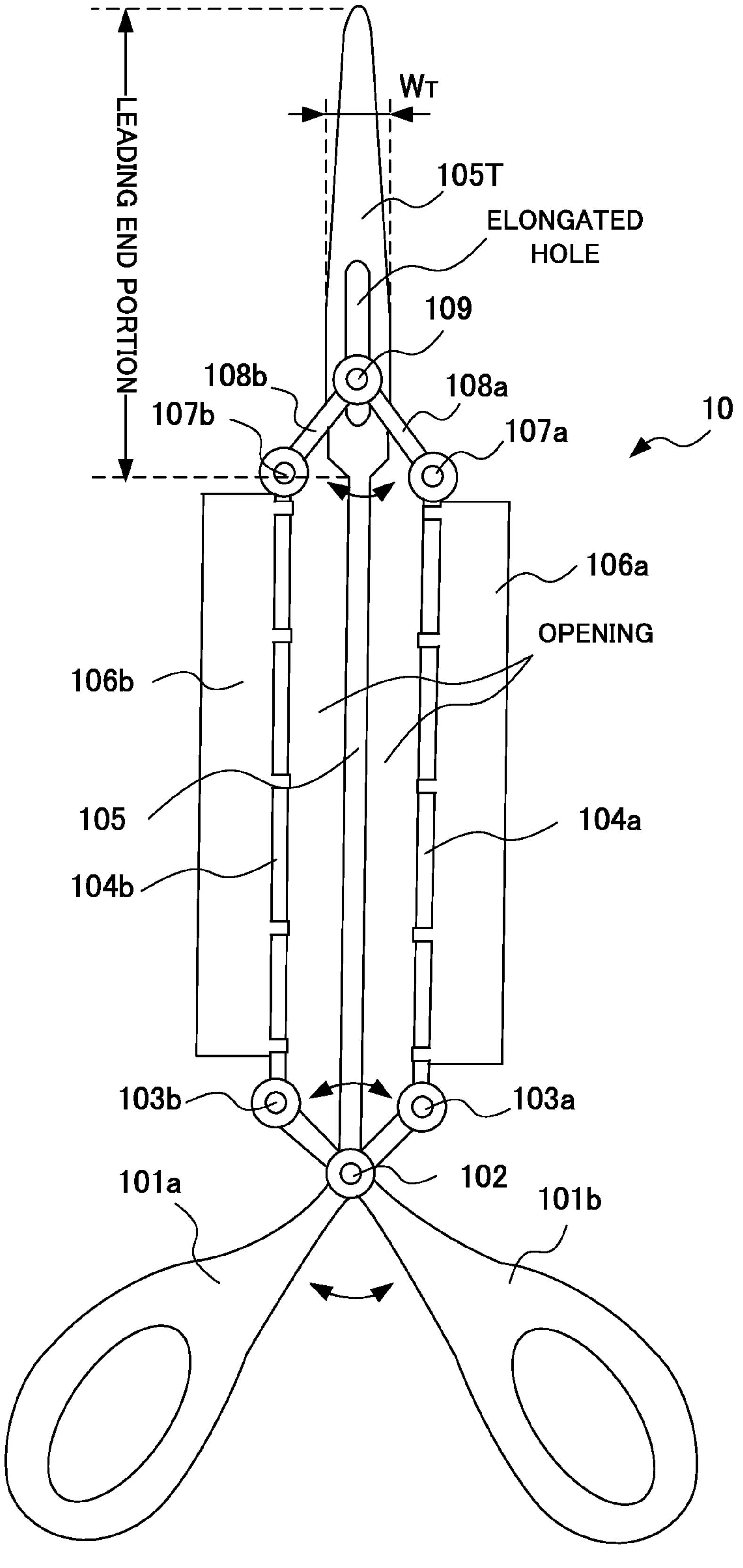
FIG. 1 is a plan view showing an opening tool of a first embodiment according to the present invention.
Figure 2:
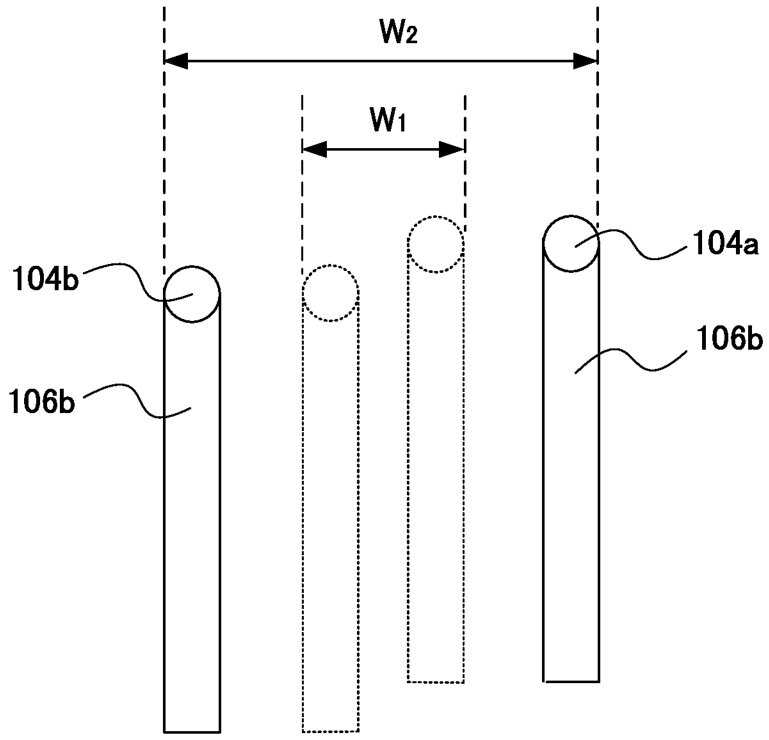
FIG. 2 is an explanatory view for explaining side portions of the opening tool.
Figure 3:
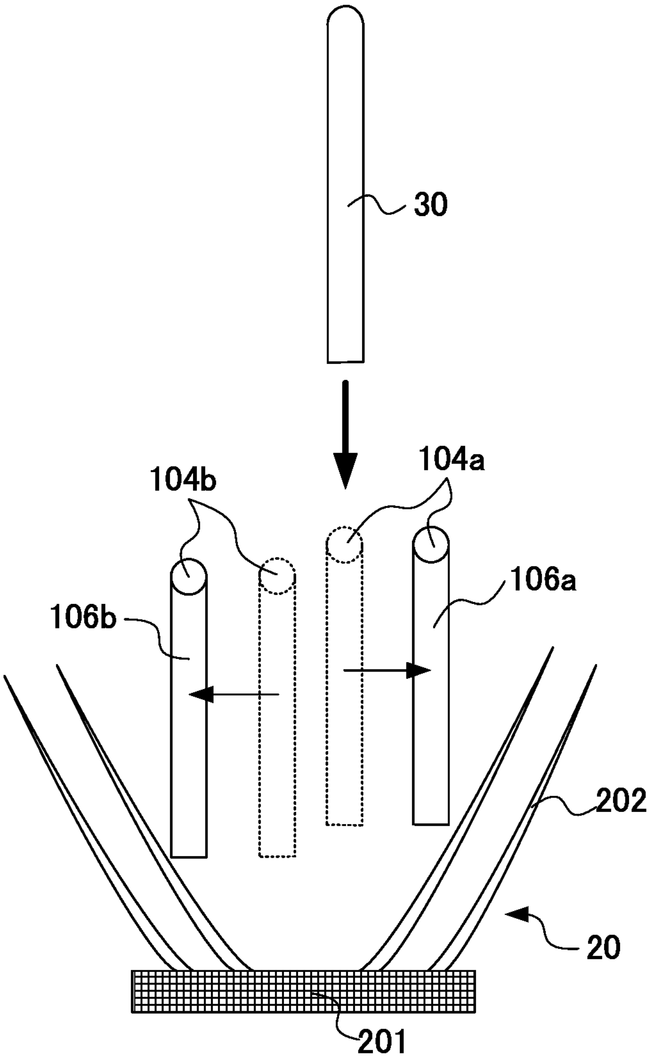
FIG. 3 is a diagram showing a state in which the grass of artificial grass is pushed apart with the opening tool, and a U-shaped nail is driven into an exposed bottom.
Figure 4:
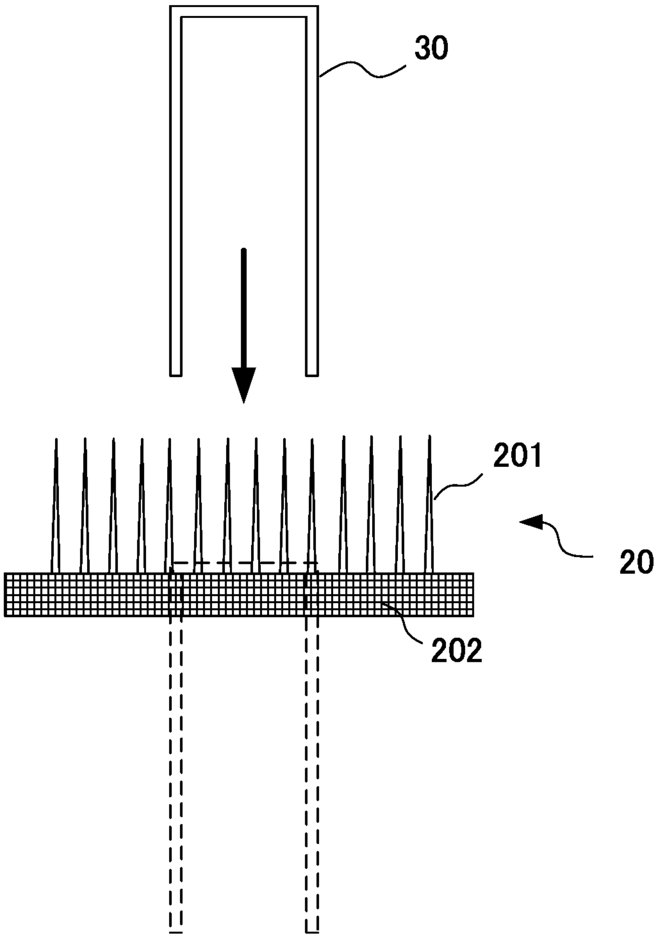
FIG. 4 is a diagram showing a state of driving the U-shaped nail into the artificial grass.

FIG. 1 is a plan view showing an opening tool of a first embodiment according to the present invention. FIG. 2 is an explanatory view for explaining side portions of the opening tool. FIG. 3 is a diagram showing a state in which the grass of artificial grass is pushed apart with the opening tool, and a U-shaped nail is driven into an exposed bottom. FIG. 4 is a diagram showing a state of driving the U-shaped nail into the artificial grass. As shown in FIG. 1, an opening tool 10 is a scissor-type opening tool in which rods 104*a* and 104*b* are moved away from and toward each other by opening and closing handles 101*a* and 101*b*.

As shown in FIG. 1, the opening tool 10 includes the handles 101*a* and 101*b*, a screw 102 serving as a fulcrum, screws 103*a* and 103*b* respectively provided at the leading ends of the handles 101*b* and 101*b*, rods 104*a* and 104*b* each having one end connected to a respective one of the screws 103*a* and 103*b*, the rods 104*a* and 104*b* being capable of moving in a linear direction (width direction, the right/left direction in FIG. 1), a support 105 having one end connected to the screw 102, and plates 106*a* and 106*b* that are respectively rotatably connected to the rods 104*a* and 104*b*. The opening tool 10 includes a screw 107*a* for rotatably connecting the other end of the rod 104*a* to one end of a relay member 108*a*, a screw 107*b* for rotatably connecting the other end of the rod 104*b* to one end of a relay member 108*b*, and a screw 109 for connecting the other end of the relay member 108*a* to the other end of the relay member 108*b*.

The screw 102 constitutes a first coupler, the screws 103*a* and 103*b* constitute second couplers, the screws 107*a* and 107*b* constitute third couplers, and the screw 109 constitutes a fourth coupler. The rod 104*a* and the plate 106*a* serve as a first side portion of the opening tool, and the rod 104*b* and the plate 106*b* serve as a second side portion of the opening tool.

The leading end of the support 105 has a pointed portion 105T, and the pointed portion 105T is provided with an elongated hole into which the screw 109 is fitted so as to be linearly movable. The pointed portion 105T serves as a leading end portion that extends in the length direction of the opening tool.

Referring to FIG. 1, when a user draws together the handles to reduce the space between the handle 101*a* and the handle 101*b* of the opening tool 10, the screw 109 moves in the forward direction of the elongated hole (the upper direction in FIG. 1), and the opening between the support 105 and the rod 104*a* and the opening between the support 105 and the rod 104*b* become narrow. The plates 106*a* and 106*b* are rotated in a downward direction with the rods 104*a* and 104*b* as the axis of rotation to make the plates 106*a* and 106*b* face each other (indicated by dashed lines in FIG. 2). The plates 106*a* and 106*b* stop at the positions indicated by the dashed lines in FIG. 2, that is, at the positions where the plates 106*a* and 106*b* face each other, and do not rotate further inward. In this state, the distance $W_1$ between the outer edge of the rod 104*a* and that of the rod 104*b* is greater than the width $W_T$ of the pointed portion 105T (the leading end portion of the opening tool) shown in FIG. 1. The distance $W_1$ may be the distance between the outer edge of the plate 106*a* and that of the plate 106*b*. The same applies to the distance $W_2$ described later.

The pointed portion 105T is initially inserted into grass 202 of artificial grass 20, and then the plates 106*a* and 106*b* are inserted into the grass 202 of the artificial grass 20. Since the support 105 has the pointed portion 105T, the grass 202 of the artificial grass 20 can be separated and the opening tool 10 can be inserted easily. Since the distance $W_1$ is greater than the width $W_T$, the plates 106*a* and 106*b* push the grass 202 apart to the right and left.

Subsequently, when the user draws apart the handles to increase the space between the handle 101*a* and the handle 101*b* of the opening tool 10, the screw 109 moves in the rearward direction of the elongated hole (downward direction in FIG. 1). The distance between the outer edge of the rod 104*a* and that of the rod 104*b* becomes greater (distance $W_2$>distance $W_1$>width $W_T$). The opening between the support 105 and the rod 104*a* and the opening between the support 105 and the rod 104*b* are widened.

As shown in FIG. 2, as the distance between the outer edge of the rod 104*a* and that of the rod 104*b* increases, the distance between the plate 106*a* and the plate 106*b* also increases, and as shown in FIG. 3, the plates 106*a* and 106*b* further push the grass 202 apart to the right and left. Then, a bottom face of a bottom 201 of the artificial grass 20 is exposed. As shown in FIGS. 3 and 4, a U-shaped nail 30 is inserted into the exposed bottom face through the opening, further the U-shaped nail 30 serving as a fastener is driven, and thereby the U-shaped nail 30 can be driven into the ground without the U-shaped nail 30 becoming entangled with the grass 202.

In the present embodiment, the distance between the outer edge of the rod 104*a* and that of the rod 104*b* is increased when the user draws apart the handles to increase the space between the handle 101*a* and the handle 101*b* of the opening tool 10, but the distance between the outer edge of the rod 104*a* and that of the rod 104*b* may be decreased when the user draws apart the handles to increase the space between the handle 101*a* and the handle 101*b* of the opening tool 10.

Modification

The openings shown in FIG. 1 are formed to drive the U-shaped nail into the ground, but the positions where the openings are provided are not limited to this configuration.

Figure 5:
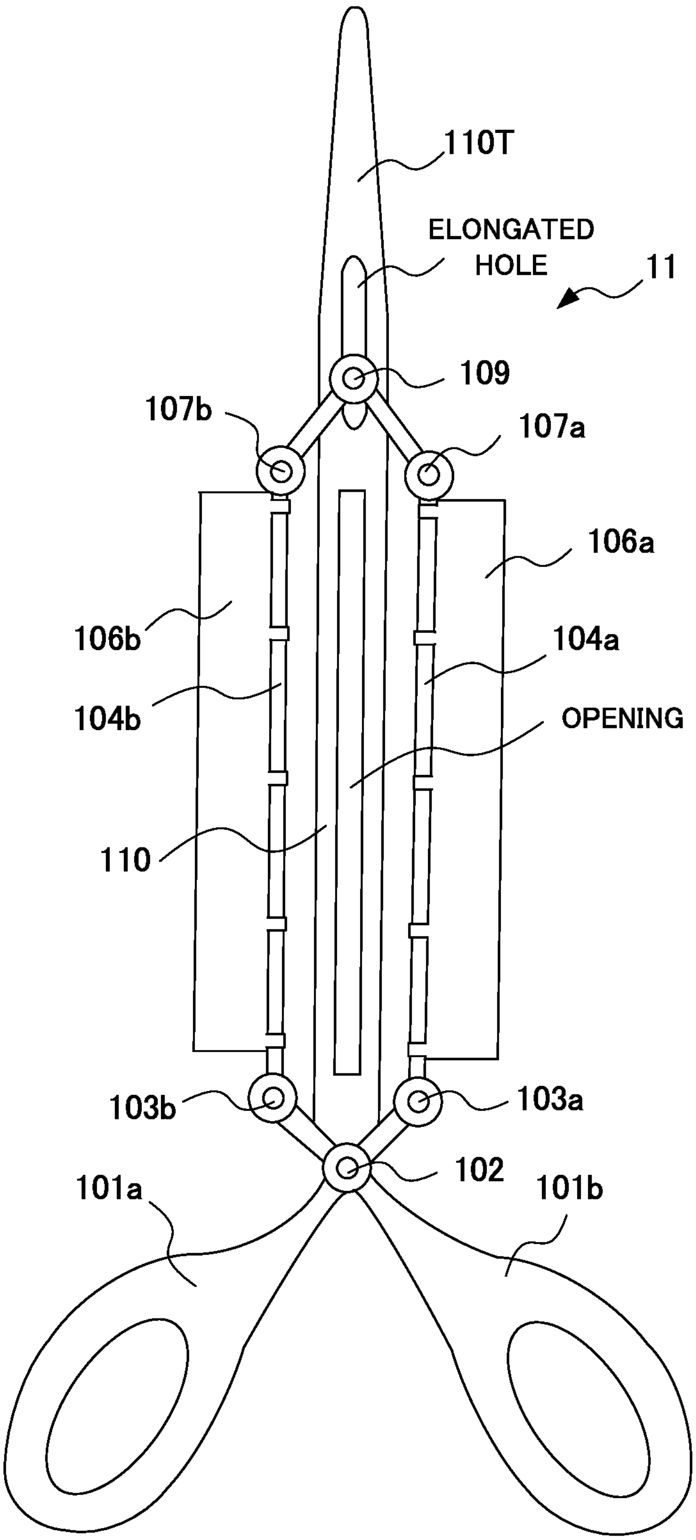
FIG. 5 is a plan view showing a modification of the opening tool of the first embodiment according to the present invention.

FIG. 5 is a plan view showing a modification of the opening tool of the first embodiment according to the present invention. In FIG. 5, the same components as those in FIG. 1 are denoted by the same reference numerals, and description thereof is omitted. In the opening tool 10 of the embodiment shown in FIG. 1, the openings are formed between the support 105 and the rod 104*a* and between the support 105 and the rod 104*b*. In the opening tool 11 of the modification shown in FIG. 5, a support 110 having a pointed portion 110T is used instead of the support 105, and an opening is provided in the support 110 itself. In this modification, the opening can be placed in the center of the opening tool 11.

Second Embodiment

In the first embodiment, the opening tool is a scissors-type tool, and the plates 106*a* and 106*b* are pushed apart to the right and left to expose the bottom face of the bottom 201 of the artificial grass 20, so that the U-shaped nail can be driven into the ground without the U-shaped nail becoming entangled with the grass. However, it is only required that an opening tool includes a leading end portion that facilitates insertion of the opening tool into the grass of the artificial grass, and a first side portion and a second side portion having a greater distance between the outer edge of the first side portion and that of the second side portion than the width of the leading end portion, which allow the grass to be pushed apart to the right and left.

Figure 6:
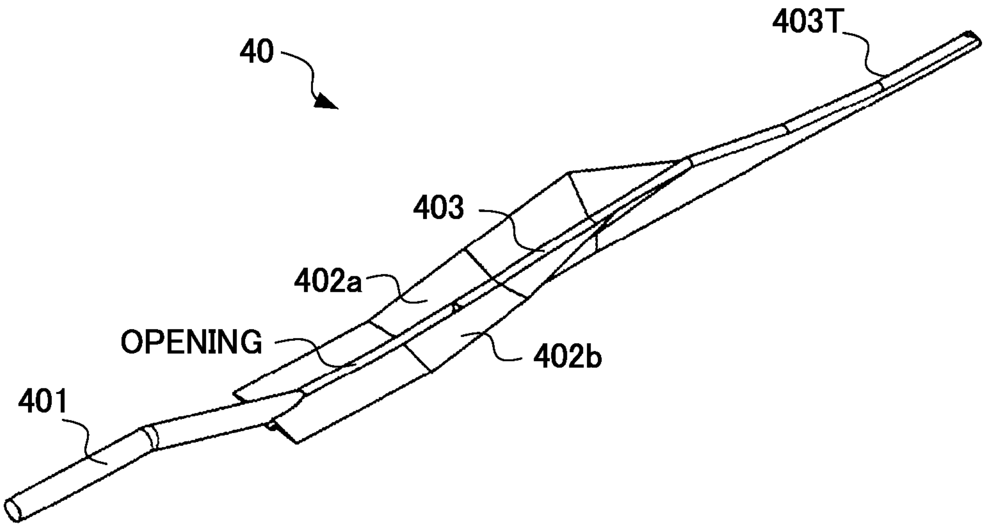
FIG. 6 is a perspective view of an opening tool of a second embodiment according to the present invention as seen from above.
Figure 7:
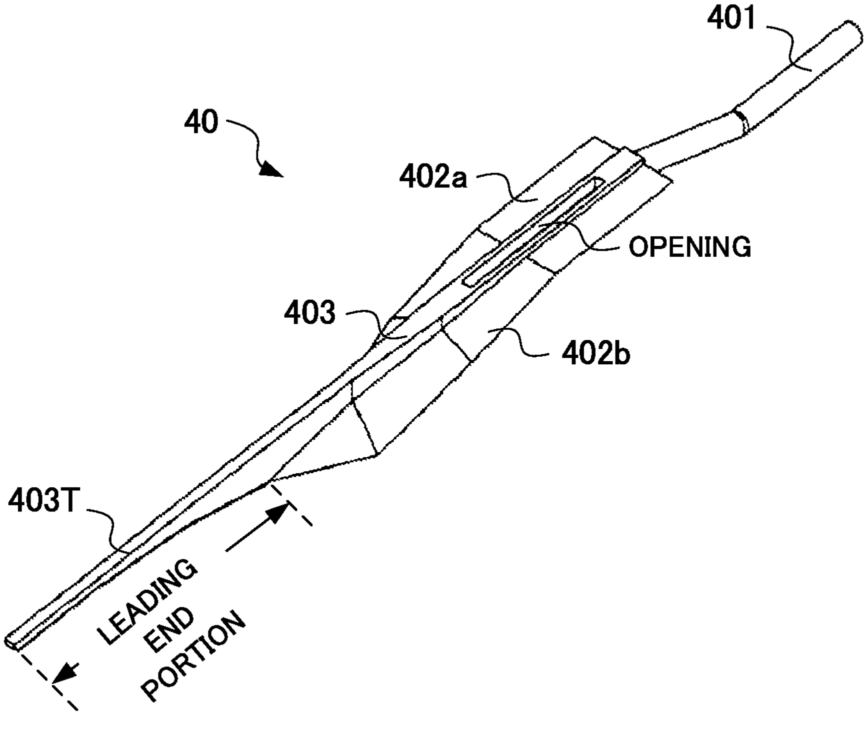
FIG. 7 is a perspective view of the opening tool of the second embodiment according to the present invention as seen from below.
Figure 8:
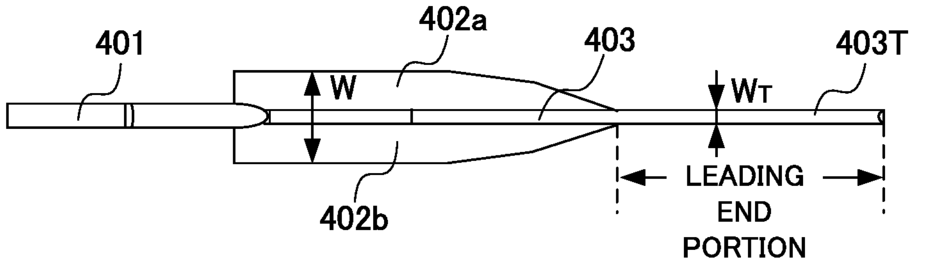
FIG. 8 is a plan view of the opening tool of the second embodiment according to the present invention.
Figure 9:
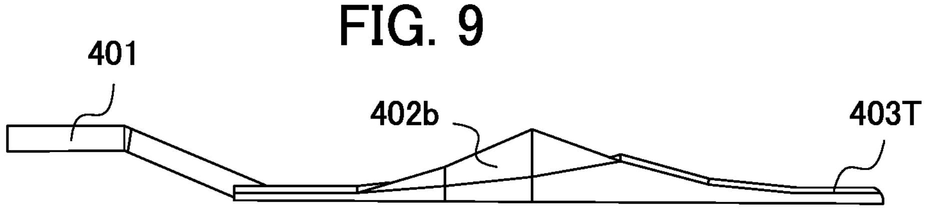
FIG. 9 is a side view of the opening tool of the second embodiment according to the present invention.
Figure 10:
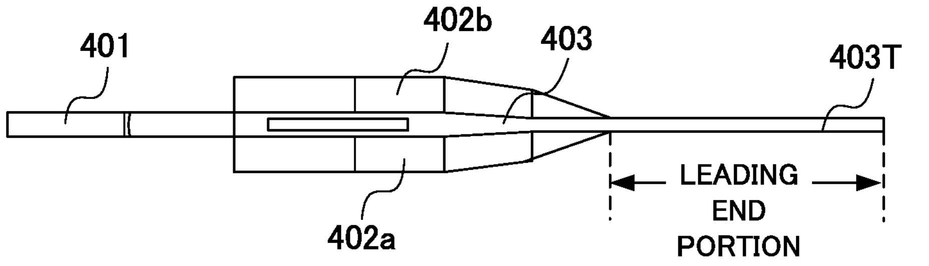
FIG. 10 is a bottom view of the opening tool of the second embodiment according to the present invention.

FIG. 6 is a perspective view of an opening tool of a second embodiment according to the present invention as seen from above. FIG. 7 is a perspective view of the opening tool of the second embodiment according to the present invention as seen from below. FIG. 8 is a plan view of the opening tool of the second embodiment according to the present invention. FIG. 9 is a side view of the opening tool of the second embodiment according to the present invention. FIG. 10 is a bottom view of the opening tool of the second embodiment according to the present invention.

As shown in FIGS. 6 to 10, an opening tool 40 includes a handle 401, a first side portion 402*a*, a second side portion 402*b*, and a central portion 403 having one end connected to the handle 401 and the other end including a leading end portion 403T. The first side portion 402*a* and the second side portion 402*b* are respectively connected to both sides of the central portion 403. The leading end portion 403T of the central portion 403 serves as the leading end of the opening tool 40. The leading end portion 403T of the opening tool 40 is initially inserted into the grass 202 of the artificial grass 20, and then the first side portion 402*a* and the second side portion 402*b* are inserted into the grass 202 of the artificial grass 20. The leading end portion 403T is a leading end portion extending in the longitudinal direction of the opening tool 40. The distance W between the outer edge of the first side portion 402*a* and that of the second side portion 402*b* is greater than the width $W_T$ of the leading end portion 403T.

When the opening tool 40 is pushed forward by pushing the handle 401, the first side portion 402*a* and the second side portion 402*b* separate the grass 202 of the artificial grass 20 to expose a bottom face of the bottom 201 of the artificial grass 20. A U-shaped nail serving as a fastener is inserted into the exposed bottom face through the opening of the central portion 403 shown in FIGS. 6 and 7, further the U-shaped nail is driven, and thereby the U-shaped nail can be driven into the ground without the U-shaped nail becoming entangled with the grass 202.

The opening tool 40 of the present embodiment is simpler in structure, easier to operate, and less costly than the opening tools 10 and 11 of the first embodiment.

While embodiments of the present invention have been described above, embodiments of the present invention are not limited to the above-described embodiments.

The opening tool of the present embodiment is easy to be inserted into the grass of artificial grass by including the leading end portion, and can separate the grass of the artificial grass to expose the bottom by including the first side portion and the second side portion having a greater distance between the outer edges than the width of the leading end portion. Further, it allows a fastener such as a U-shaped nail to be driven into the ground through the opening by forming the opening. The present invention is not limited to the configurations of the first and second embodiments described above as long as the leading end portion, the first side portion and the second side portion, and the opening can be formed. The fastener is not limited to U-shaped nails, and nails of other shapes may be used. The coupler is not limited to screws, and other couplers may be used.

REFERENCE NUMERALS

10, 11, 40 opening tool
101*a*, 101*b* handle
102, 103*a*, 103*b*, 107*a*, 107*b*, 109 screw
104*a*, 104*b* rod
105, 110 support
106*a*, 106*b* plate
108*a*, 108*b* relay member
401 handle
402*a* first side portion
402*b* second side portion
403 central portion It is claimed:

1. An opening tool for separating grass of artificial grass to expose a bottom of the artificial grass, the opening tool comprising:

one leading end portion that extends in a longitudinal direction; and a first side portion and a second side portion that are connected to the one leading end portion, an opening being formed between the first side portion and the second side portion and in an area separate from the one leading end portion, the opening being an opening through which a fastener for fixing the artificial grass can pass and through which the fastener can be driven into the bottom, a distance between an outer edge of the first side portion and that of the second side portion being greater than a width of the one leading end portion, and the first side portion and the second side portion pushing the grass apart to expose the bottom.

2. The opening tool according to claim 1, comprising:

a pair of handles;

a first coupler that serves as a fulcrum for the pair of handles;

two second couplers each provided at a leading end of a respective one of the pair of handles;

two rods each having one end connected to a respective one of the two second couplers, the two rods being capable of moving in a width direction;

a support having one end connected to the first coupler;

two plates each rotatably connected to a respective one of the two rods;

two relay members each having one end connected to the other end of a respective one of the two rods;

two third couplers each connecting the other end of a respective one of the two rods to the one end of a respective one of the two relay members; and a fourth coupler that connects the other ends of the two relay members and is movably fitted into an elongated hole provided in the support, the support including the one leading end portion, one of the two rods and one of the two plates serving as the first side portion, and the other of the two rods and the other of the two plates serving as the second side portion, and the opening being formed between the support and one of the two rods.

3. The opening tool according to claim 1, comprising:

a pair of handles;

a first coupler that serves as a fulcrum for the pair of handles;

two second couplers each provided at a leading end of a respective one of the pair of handles;

two rods each having one end connected to a respective one of the two second couplers, the two rods being capable of moving in a width direction;

a support having one end connected to the first coupler;

two plates each rotatably connected to a respective one of the two rods;

two relay members each having one end connected to the other end of a respective one of the two rods;

two third couplers each connecting the other end of a respective one of the two rods to the one end of a respective one of the two relay members; and a fourth coupler that connects the other ends of the two relay members and is movably fitted into an elongated hole provided in the support, the support including the one leading end portion, one of the two rods and one of the two plates serving as the first side portion, and the other of the two rods and the other of the two plates serving as the second side portion, and the opening being formed in the support.

4. The opening tool according to claim 1, comprising:

a handle; and a central portion having one end connected to the handle and the other end including the one leading end portion, the first side portion and the second side portion being respectively connected to both sides of the central portion, and the opening being formed in the central portion.

5. A method for driving a fastener into artificial grass using an opening tool that separates grass of the artificial grass to expose a bottom of the artificial grass, the opening tool comprising:

one leading end portion that extends in a longitudinal direction; and a first side portion and a second side portion that are connected to the one leading end portion, an opening being formed between the first side portion and the second side portion and in an area excluding the one leading end portion, the opening being an opening through which the fastener for fixing the artificial grass can pass, and a distance between an outer edge of the first side portion and that of the second side portion being greater than a width of the one leading end portion, the method comprising:

inserting the one leading end portion of the opening tool into the grass initially;

pushing the grass apart with the first side portion and the second side portion to expose the bottom; and driving the fastener into the bottom through the opening.

* * * * *